July 27, 1954   D. B. ROSSHEIM ET AL   2,684,528
METHOD OF SHAPING PLATES OF THERMOPLASTIC MATERIAL
Filed April 13, 1949                    3 Sheets-Sheet 1

INVENTORS
DAVID B. ROSSHEIM
STEPHEN A. YACZKO
JOHN M. TRAINOR
BY Virgil F. Davies
ATTORNEY July 27, 1954   D. B. ROSSHEIM ET AL   2,684,528
METHOD OF SHAPING PLATES OF THERMOPLASTIC MATERIAL
Filed April 13, 1949   3 Sheets-Sheet 2

INVENTORS
DAVID B. ROSSHEIM
STEPHEN A. YACZKO
JOHN M. TRAINOR
BY Virgil F. Davris
ATTORNEY

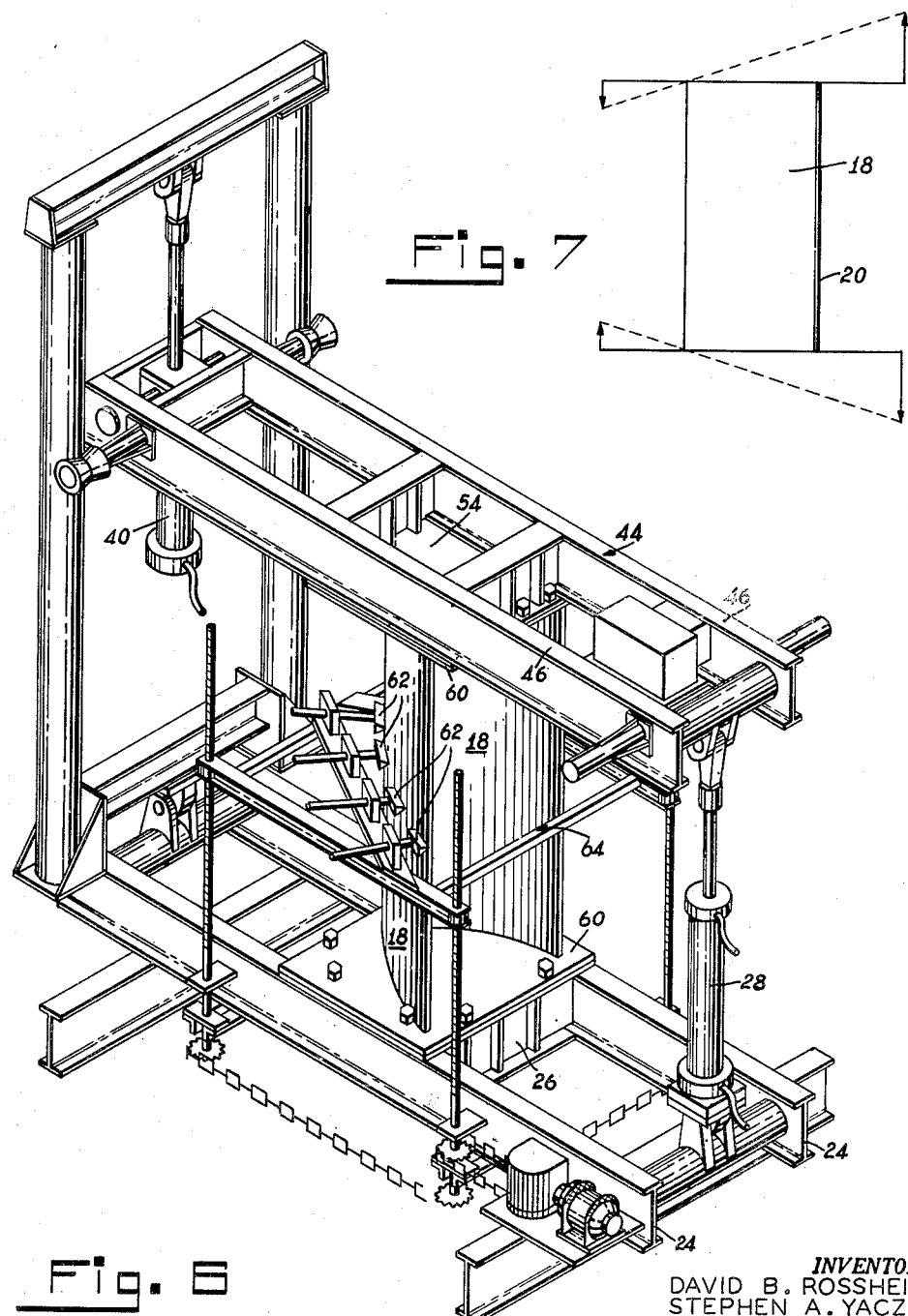

Patented July 27, 1954

2,684,528

UNITED STATES PATENT OFFICE 2,684,528

METHOD OF SHAPING PLATES OF THERMOPLASTIC MATERIAL

David B. Rossheim, Teaneck, Stephen A. Yaczko, Bayonne, and John M. Trainor, Jersey City, N. J., assignors to The M. W. Kellogg Co., Jersey City, N. J., a corporation of Delaware Application April 13, 1949, Serial No. 87,164

4 Claims. (Cl. 29—480)

The present invention relates to a method of manufacturing containers, and more particularly relates to a method of manufacturing vessels having spherical, ellipsoidal, and the like, shapes.

The manufacture, by prior art methods, of spherical, ellipsoidal, and the like, shaped vessels, particularly those of large size which are adapted to contain gases and/or liquids under pressure, has been a difficult, expensive, time consuming, and more or less hit or miss operation. The vessels are fabricated, under prior art methods, from plates having various sizes and shapes that are bent by rolling, pressing, forging, etc., to approximately the contour of a predetermined portion of the vessel. These plates are then assembled by means of bolts, rivets, welding, or the like, to form the vessel. It is extremely difficult, and often impossible, to bend the prior art plates with any degree of accuracy, so that it is necessary to force many sections, by means of jacks, strong backs, etc., into alignment with other sections. Consequently many objectionable stresses are set up in the vessel. Also, it is impossible to bend large sections by the prior art methods, with the result that the vessels formed therefrom have a large percentage of their area made up of seams. These seams, in addition to being expensive to make, are difficult to inspect and often are sources of leaks and failure in the finished vessel.

It is accordingly one object of the present invention to provide a method whereby thermoplastic material e. g. steel can be accurately bent to form segments of a spherical, ellipsoidal, or the like, shaped vessel.

It is another object of the present invention to provide a method whereby relatively large sheets of thermoplastic material can be accurately bent to form segments of a spherical, ellipsoidal, or the like, shaped vessel.

It is another object of the present invention to provide a method of bending sheets of thermoplastic material to form surfaces of revolution such as portions of spheres, ellipsoids, tori, paraboloids, helices, and the like.

It is yet another object of the present invention to provide a method of making thermoplastic component parts of curvilinear containers by shaping said thermoplastic component parts by hot-working in which unit areas of each of said component parts are sequentially heated to a chosen working temperature, while the remainder of the part is maintained in condition to resist deformation, and said remainder employed to control the shaping of each of said unit areas, the dimensions of said unit areas being so chosen that the dimension in the direction, or directions, along which uneven plastic flow and/or inelastic instability tends to occur does not substantially exceed a critical value.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings, wherein:

Fig. 6 is a somewhat diagrammatic perspective view of one type of apparatus that may be employed to shape the assembly of Fig. 4; and Fig. 7 is a diagram illustrating a manner in which the shaping forces can be applied to sheets of thermoplastic material to shape said sheets into segments of a sphere.

The present invention comprises a method of manufacturing curvilinear containers by shaping a plurality of sheets of thermoplastic material, by hot working, to the desired contour of the container by first bending the sheets of thermoplastic material along one axis to conform to one radius of curvature of the vessel, and then bending the plates along a second axis to conform to a second radius of curvature of the vessel, while maintaining said first mentioned radius of curvature substantially undisturbed, by sequentially heating predetermined unit areas thereof to the chosen working temperature, maintaining the remainder thereof in a condition to resist deformation, and employing said remainder to control the shaping of each of said unit areas, and assembling the sheets thus shaped into the finished container. Preferably the sheets thus shaped comprise a segment of a ring section of the vessel.

Curvilinear vessels of any desired shape or configuration can be made by the method of the present invention. However, the invention will be specifically described in connection with the manufacture of a spherical container.

Figure 1:
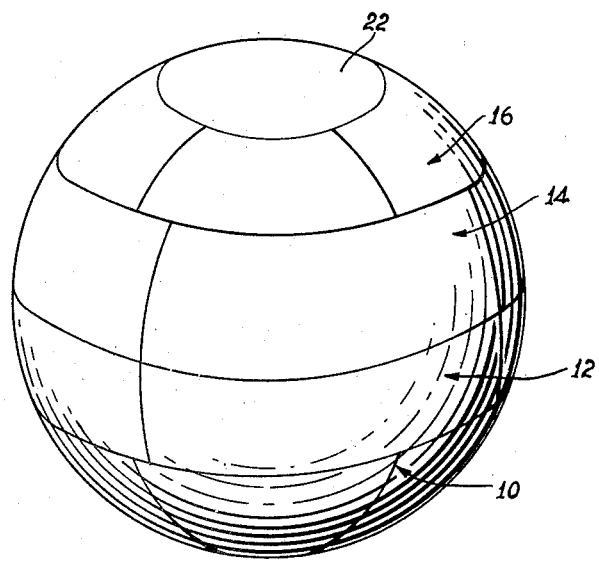
Fig. 1 is a spherical pressure container made by the method of the present invention.
Figure 2:
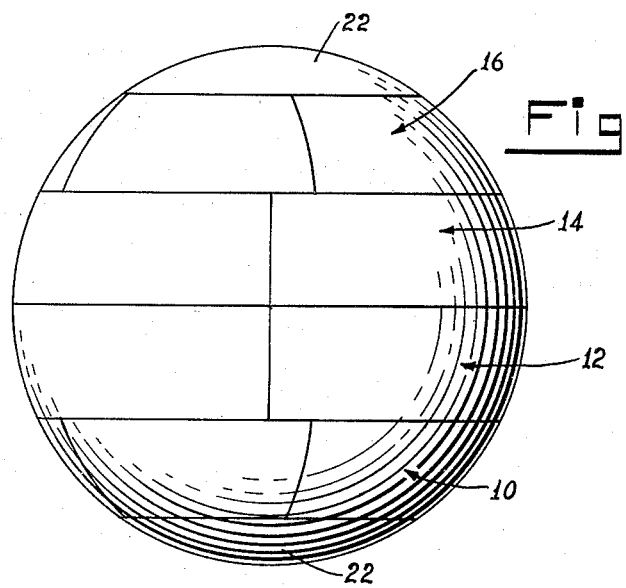
Fig. 2 is an elevational view of the container of Fig. 1.

Figures 1 and 2, respectively, are perspective and elevational views of a spherical pressure vessel comprising a plurality of substantially parallel rings 10, 12, 14 and 16, each of which are fabricated from four segments of a sphere. Obviously, a spherical vessel can be made up of any desired number of rings. However, it is desirable to fabricate the vessels from as few rings as possible to reduce to a minimum the amount of welding, riveting, or other fastening necessary. This means that each ring should be as wide as possible. We have found that four rings is a preferred number for the manufacture of most large spherical vessels. Each ring is fabricated from a plurality of spherical segments and any desired number of segments may be employed to form said rings. It is preferred, however, to fabricate the rings 10, 12, 14 and 16 from four spherical segments each including 90° of arc. The present invention will therefore be explained in terms of a spherical vessel comprising four rings each comprising four spherical segments, but it will be understood that this is for the the purpose of illustration only and not by way of limitation.

Figure 3:
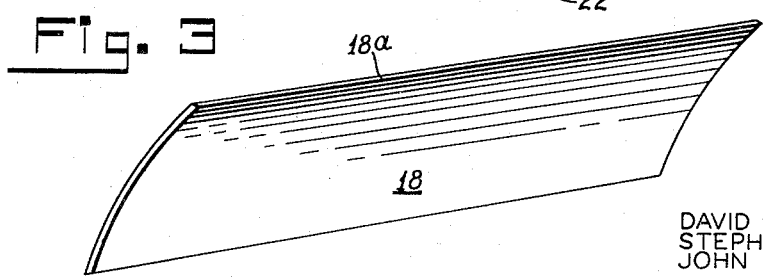
Fig. 3 is a perspective view of a sheet of thermoplastic material that has been bent to one curvature of the finished container.
Figure 4:
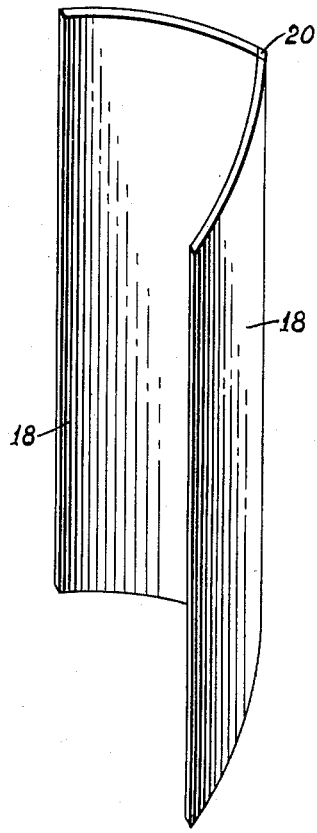
Fig. 4 is a perspective view of two of the plates of Fig. 3 welded together along one edge preparatory to being bent to conform to a second curvature of a container.
Figure 5:
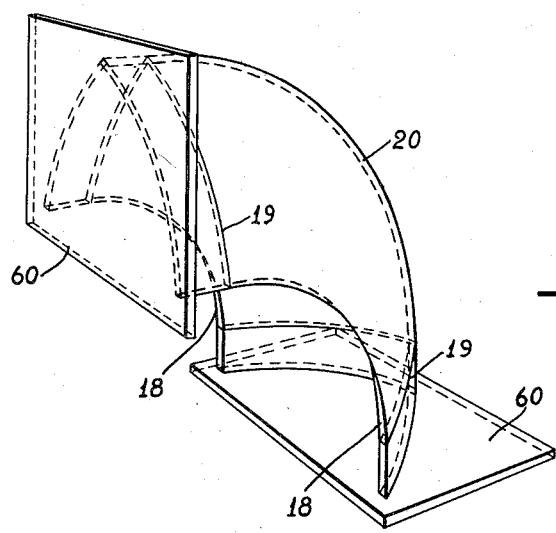
Fig. 5 is a perspective view of the plates of Fig. 4 after they have been bent to conform to the second curvature of the container.

Flat rectangular plates are shaped in the method of the present invention to form the spherical segments which are component parts of rings 10, 12, 14 and 16. The general dimensions of each of the rectangular plates is dependent upon the size of the vessel being constructed, the number of rings desired to form said vessel, the number of spherical segments to be used to form each ring, and the particular ring being fabricated. Each rectangular plate has a width substantially equal to the desired arcuate width of the ring being fabricated and a length sufficient to yield a spherical segment substantially equal to one quarter of the ring being fabricated. The rectangular plates may be of any thermoplastic material suitable to withstand the service the vessel is intended to perform. However, the invention will be explained in connection with the use of steel plates. Figs. 3, 4 and 5 illustrate steps in the shaping of the spherical segments employed in the fabrication of rings 10 and 16.

Rectangular plates 18 are first bent around their longitudinal axis, as illustrated in Fig. 3, to a radius substantially identical to the great circle radius of the spherical vessel to be constructed therefrom. This bending operation may be made by any method capable of producing bends of the desired accuracy, as for example, by means of a bending roll, brake or press, or by means of incremental bending wherein a plurality of narrow bands are sequentially heated above their yield point and bent to the desired radius.

Plates 18 bent as above described to the great circle radius of the sphere are next bent around a second axis to conform to a second radius of the spherical vessel being constructed. The second bending operation is conducted in such a manner that the first imparted great circle radius is not changed to any appreciable degree. The manner in which this second bend is made will now be explained in detail.

Application Serial No. 679,900, filed June 28, 1946, by David B. Rossheim et al., for "Method of Bending Thin Walled Thermoplastic Bodies Including Tubes," issued as Patent 2,480,774, dated August 30, 1949, discloses a method of bending thin-walled pipe by sequentially heating narrow circumferential unit bands of predetermined width to a predetermined uniform temperature to render the material thereof capable of substantially uniform plastic flow and maintaining the material of the pipe adjacent to said heated band in condition to resist deformation, said adjacent material being employed to control the shaping of each of said unit bands.

Application Serial No. 27,978, dated May 19, 1948, by Frederick A. Fichtmueller, for "Method and Apparatus for Bending Pipe," now Patent No. 2,609,859, discloses an improvement in the method of bending pipe disclosed in said application Serial No. 679,900, now issued as Patent 2,480,774, dated August 30, 1949, wherein the bending force applied to the pipe is in the form of a substantially pure bending moment or couple. Application Serial No. 27,978, now Patent No. 2,609,859, also discloses an apparatus comprising adjustable torches, means for moving the torches along the pipe being bent to sequentially heat circumferential bands of predetermined width, means for holding the pipe, and means for applying a substantially pure bending moment thereto to bend each heated band a predetermined amount.

We have found that plates of thermoplastic material that have been curved along one of their axes can be shaped by hot working to many curvilinear shapes by sequentially heating predetermined areas thereof to a uniform temperature whereat said areas are capable of substantially uniform plastic flow, and maintaining the material of said plates adjacent to said areas at a lower temperature so that they are in condition to resist deformation, employing said cooler adjacent areas to control the shaping of said heated areas and arranging said plates, and so applying the shaping forces thereto, so that the forces are distributed throughout said plates in a predetermined manner.

Each ring 10, 12, 14, or 16 forming a part of the spherical vessel, has the configuration of a periphery of slice taken through a sphere parallel to its equator. To form bent plates 18 so that they will each have the configuration of a segment of one of said rings, it is necessary that the bending or shaping force or forces employed to so shape the bent plates 18 be applied thereto in a plane or phanes parallel to the plane of the particular ring being formed. It will therefore be seen that the shaping force or forces cannot be applied radially, or in a balanced manner, to a single bent plate except in the special case when the plate is to be fabricated into a ring adapted to form the mid-section of the sphere. The necessity for applying the shaping forces in a direction diagonal to the surface of bent plate 18 results in the uneven distribution and unbalance of the bending or shaping forces within the plate. This unbalance of the forces within the plate causes the plate to tend to twist rather than to bend in a predetermined manner around a second axis, by substantially uniform plastic deformation, while substantially retaining the great circle radius imparted thereto by the first bending operation.

This uneven distribution of forces within a single bent plate 18 is balanced by assembling two of the plates into a single unit or structure, prior to shaping them into segments of a ring, in such a manner that the unbalance of forces in a single plate and the tendency of a single plate to twist is opposed and balanced by a similar but opposite unbalance and tendency to twist in the second plate, two plates 18, bent to the above described radius, are placed with their longitudinal axes substantially parallel and with their concave faces in generally face-to-face relation so that their edges 18a are together, and the two plates diverge from each other from said edges 18a at an angle equal to the angle that rings 10 and 16 make with each other in the spherical vessel. Another way of stating this is to say that the two plates diverge from each other at an angle equal to twice the angle the surface of either ring will make with a plane through the equator of the spherical vessel. Edges 18a are then rigidly fastened together by weld 20 to form the assemblage illustrated in Fig. 4, and this assemblage is then bent by means of incremental bending, to be explained more in detail hereinafter, to the radius of curvature of ring 10 or 16.

After this second bend has been made to give the structure illustrated in Fig. 5, the unbent ends adjacent plates 60 are cut off at 19—19 and the two plates 18—18 are separated from each other by removing weld 20 to give two spherical segments. These two spherical segments are then welded together end to end to form one-half of ring 10 or 16. This process is repeated until eight spherical segments have been bent and two complete rings 10 and 16 formed therefrom.

Rings 12 and 14 are made in a manner generally similar to rings 10 and 16. The rectangular plates employed to form the spherical sections are of greater length than plates 18 to account for the greater diameter of the sphere at its midpoint. After the initial bending has been done to impart the great circle radius of the spherical vessel to the plates, the two plates are welded together along their edges so that the great circle radius is continued from one plate to the other. These two plates are then bent by means of incremental bending to the curvature of rings 12 and 14. The two spherical segments thus formed for rings 12 and 14 are not separated along their welded joint, but three more units are similarly bent and the four units are welded together end to end to form rings 12 and 14 as a unit.

After rings 12 and 14 have been formed, rings 10 and 16 are placed in their proper relationship to said rings 12 and 14 and are welded thereto along their meeting edges. The openings left at the top and the bottom of the container are then closed by means of capping members 22 which are circular members dished to the great circle radius of the spherical container.

It will be understood that the above described spherical pressure vessel can be provided with any desired conventional type openings or nozzles to provide ingress and egress to the interior thereof.

In shaping thermoplastic bodies by hot working operations the undesired deformations or distortions usually encountered are buckling, localized upsetting and localized thinning-out. The last is encountered in operations involving tension, while the others are compression phenomena.

The above mentioned undesired deformations or distortions can be substantially eliminated when the shaping is done by the incremental method and by selecting a proper width for the unit area heated and shaped. As stated above, buckling is an unwanted deformation that results from compressive forces. Furthermore, the amount of buckling normally obtained in hot working thermoplastic bodies by prior art methods depends upon the thickness of the material being shaped, inasmuch as the resistance of a thin-walled structure to buckling is less than its resistance to plastic deformation, whereas the resistance of a thick-walled structure to buckling is greater than its resistance to plastic deformation. It has been found that buckling of thin-walled material, wherein the resistance of said material to buckling is less than its resistance to plastic deformation, can be substantially eliminated if the width of the area heated does not exceed one-half the natural buckling wave length of the sheet material at its working temperature. In operations involving pure tension, localized thinning out can be completely eliminated if the width of the unit area heated is equal to or greater than the thickness of the structure being shaped. However, in actual practice combined forces and multi-axial stresses are the rule and pure tension or pure compression are in the nature of exceptions and the dimensions stated above can only serve as guides in the determination of the best width of unit area for each particular case.

The spacing of the shaping steps, that is, the distance through which the structure being shaped and the heating torches are moved relative to each other after each application of the shaping force, is of great importance. The proper choice of spacing between each shaping step materially affects the quality of the shaped product. It is preferred that in every case the spacing between shaping steps be less than the width of the unit area heated in order to avoid including in the shaped portion of the body narrow zones of improperly heated and shaped material which would give said shaped portion an uneven appearance. In other words, the successive unit areas should be overlapped sufficiently to insure that all of the material of the shaped portion of the body has been properly heated and shaped. Furthermore, by properly selecting the spacing between the shaping steps, the effects of any residual unwanted deformation, which occasionally is unavoidable due to limitations of the heating equipment to heat a sufficiently narrow band, can be completely eliminated or reduced to an insignificant amount. Any such residual unwanted deformations are repeated in each unit area, and furthermore occur in each area at substantially the same relative position. Therefore, if the unit areas are overlapped to such an extent that the unwanted deformations of one unit area unite with the unwanted deformations of the contiguous unit areas, the effects of said unwanted deformations disappear.

The manner in which each of the unit areas is heated is also of importance to the successful shaping of the bent plates comprising the above described assembly. The whole unit area should be heated to substantially the same temperature, and the area should be elevated to this uniform working temperature as rapidly as possible. By maintaining a uniform working temperature throughout the area, all of the material thereof will be shaped by uniform plastic flow in a predetermined manner. By rapidly heating each unit area, it is possible to maintain an abrupt temperature drop between the heated area and the adjacent material because said adjacent material does not have sufficient time to acquire much heat by conduction. It is important to have this abrupt temperature drop for two reasons: first, as stated above, each unit area heated must have a predetermined width: when a sharp temperature drop exists between the heated area and the adjacent material, the width of the area can be accurately maintained; second, when a sharp temperature drop is obtained, only a negligible amount of material is at a temperature too low for plastic deformation but too high to have sufficient strength to adequately support the heated area during the shaping operation.

Any suitable means may be employed to heat the unit areas of the plates to be bent. However, it is preferred to use an oxy-acetylene burner, or burners, for this purpose. These can be designed to heat the entire width of the area at once, or a narrow burner can be oscillated across the area to accomplish the same result.

The operation of bending or shaping two bent plates 18 assembled into a unit as above described comprises the steps of holding one end of the unit, heating, adjacent the opposite end of said unit, an area having a width predetermined in the above described manner, to a substantially uniform temperature throughout its width, at which temperature the material comprising said area becomes capable of substantially uniform plastic flow. When said temperature is attained, a bending or shaping force is applied to the heated area in such a manner that the material thereof is caused to undergo a predetermined amount of substantially uniform plastic deformation. The above described heating and bending or shaping steps are repeated along the unit until each bent plate is shaped in the manner desired.

It should be noted that while it is theoretically possible to shape the whole length of the above described assembly of bent plates 18 in the above described manner, in actual practice it is difficult to shape the material at, and closely adjacent to, each end of said assembly. It is therefore preferred that the plates shaped by the above described method have a length greater than the length required to form the desired spherical segment, equal to the lengths adjacent each end of the assembly that can not be bent. After the shaping step has been completed the unbent, or unshaped, lengths are cut away from the spherical segments before said segments are welded together end to end as above described.

Any convenient means may be employed to hold the above described assembly of bent plates, heat a transverse area of predetermined width thereon to a predetermined uniform temperature, and apply a bending or shaping force to said assembly to cause a substantailly uniform plastic flow of the material comprising said area to take place. It is preferred, however, to employ an apparatus similar to the apparatus disclosed in the above mentioned application Serial No. 27,978, to shape the bent plates 18 into segments of a sphere, or other curvilinear body, modified to permit it to heat a transverse area on the above described assembly of two bent plates 18, and to make a bend in said plates 18 of at least 90°.

Fig. 6 is a somewhat diagrammatic perspective view of such an apparatus which comprises a base member made up of two parallel I-beams 26 with a work or plate supporting platform 26 located at approximately the midpoint thereof.

A stress applying member 44 comprised of parallel I-beams 46 also has a work or plate contacting platform 54 approximately at its midpoint. A pair of force applying means, which include hydraulic cylinders 28 and 40, pivotally interconnect the ends of the base and stress applying members so that the center lines of the supporting platform 26 and work contacting platform 54 are in the same plane as the two forces exerted by the hydraulic cylinders.

Two plates 18 bent along their longitudinal axes and welded together in the above described manner are positioned in the above described apparatus by attaching one end of the assembly of bent plates 18 to supporting platform 26, and attaching the other end of said assembly to work contacting platform 54. The assembly of bent plates 18 can be attached to work supporting platform 26 and work contacting platform 54 by any desired and suitable means. It is preferred to attach the assembly of plates 18 to supporting platform 26 and work contacting platform 54 by means of two rectangular plates 60 that are welded to each end of said assembly of bent plates and then bolted to supporting platform 26 and work contacting platform 54. It will be readily understood by those skilled in the art, that inasmuch as the plane in which the forces exerted by hydraulic cylinders 28 and 40 passes through the center lines of supporting platform 26 and work contacting platform 54, the assembly of bent plates can be located between the base of the apparatus and stress applying member 44 so that the forces supplied by hydraulic cylinders 28 and 40 can be applied to the assembly of bent plates in any desired direction.

A plurality of water cooled oxy-acetylene burners 62 encircles the assembly of bent plates 18, and are carried for vertical movement along the assembly of bent plates by a substantially rectangular frame 64, the movement being controlled in the manner disclosed in application Ser. No. 27,978.

Hydraulic cylinders 28 and 40 are connected to a source of fluid under pressure in such a manner that both of said hydraulic cylinders can be operated simultaneously or separately and in either direction. Also suitable valves are provided so that one cylinder can be made to exert a greater force than the other.

An assembly of bent plates 18 is bent or shaped in the apparatus disclosed in Fig. 6 in accordance with the above described method in the following manner. Two plates 18 bent along their longitudinal axis and welded together along one edge, as above described, are mounted in the apparatus of Fig. 6 between supporting platform 26 and work contacting platform 54. Rectangular frame 64 is elevated to locate burners 62 adjacent the area on plates 18 that is to be bent or shaped first. Burners 62 are then ignited and moved up and down over said area to heat it and then shut off. The purpose of this initial heating is to elevate the temperature of said plates 18, adjacent to the first area to be bent or shaped, to substantially the equilibrium temperature of said plates 18 after the process has been in operation, thus assuring that the first area will be bent or shaped the same as succeeding areas. After the equilibrium temperature is attained, burners 62 are again ignited and moved up and down along plates 18 a distance equal to the width of the area being shaped, to rapidly and uniformly heat the material comprising said area to a predetermined temperature at which it is capable of substantially uniform plastic flow. Burners 62 heat said area at such a rapid rate that the material adjacent thereto remains relatively cool and capable of resisting plastic deformation. When the area has been heated to the predetermined desired temperature, hydraulic pressure is applied to hydraulic cylinders 28 and 40 to cause them to apply a bending moment to the heated area through stress applying member 44. The bending force is applied until the heated area is bent, by means of substantially uniform plastic flow of the material thereof, to the desired curvature. When the desired curvature is attained the bending force is stopped, burners 62 are shut off, and the heated area is allowed to cool. Burners 62 are then lowered a distance equal to the spacing between increments, and the heating and bending steps repeated. An alternative manner of employing the apparatus of Fig. 6, is to apply the bending force as soon as the burners are ignited. Inasmuch as the force applied is not sufficient to cause plastic deformation of plates 18 until they have reached the desired predetermined temperature, bending will not take place until they have been so heated. The apparatus of Fig. 6 can also be employed to continuously bend plates 18 by continuously applying the bending force, and causing burners 62 to progressively heat an area of the predetermined width along said plates 18. The rate at which said heated area is moved along said plates must be coordinated with the cooling rate of the plates after they have been bent, and the rate at which the heated area bends under the effect of the bending force.

It may be desirable at times to cause plates 18 to bend around a neutral axis that does not coincide with the longitudinal axis of said plates. The neutral axis of the bend can be located anywhere on the plates, or even off the plates by causing hydraulic cylinders 28 and 40 to exert unequal forces on stress applying member 44. Fig. 7 illustrates diagrammatically the way the neutral axis can be shifted to cause it to coincide with the edges of the plates which define the inside of the bend. To effect this shift, hydraulic cylinder 40, which applies a tensional force to the outside of the bend, is caused to exert a greater force than hydraulic cylinder 28. The exact amount that the force exerted by hydraulic cylinder 40 must be increased depends upon the width and thickness of the plates 18. Obviously, the neutral axis can be shifted towards the outside of the bend by causing hydraulic cylinder 28 to exert a greater force than hydraulic cylinder 40.

The method of bending or shaping plates has been specifically described in connection with forming plates that are curved along two different axes. It will be apparent to those skilled in the art that the method of the present invention can be applied to forming conic sections by incremental bending of two flat plates.

Since certain changes may be made in the above process without departing from the scope of the invention herein involved, it is intended that all matter container in the above description or shown in the accompanying drawing shall be interpreted as illustrative and not in a limiting sense.

What is claimed is:

1. In the method of shaping plates of thermoplastic material to predetermined curvilinear shapes by hot working, the steps comprising positioning two similar plates at an angle other than a straight angle, with an edge of one plate abutting the corresponding edge of the other plate, fastening said edges together to provide an assembly of said plates, subjecting said assembly to large quantities of heat at high temperature levels to rapidly bring a peripheral unit band thereof transverse to said edges to such a degree of plasticity that uniform plastic flow of the material thereof takes place without substantially undesired distortion upon application of bending force, the heating of said unit band being at such a rapid rate that the material of said assembly contiguous thereto remains in condition to resist deformation when bending force is applied, and applying force to said assembly in a plane including said edges to bend said unit band by substantially uniform plastic flow of the material thereof without substantial undesired distortion, said contiguous material serving to control the shaping of the material of said unit band and to maintain its contour.

2. In the method of shaping plates of thermoplastic material, as defined in claim 1, wherein the bending force is applied in a plane substantially bisecting the angle formed by said plates.

3. In the method of shaping plates of thermoplastic material, as defined in claim 1, wherein the heating of said unit band is so controlled that said unit band is of a width not greater than one-half the natural buckling wave length of said assembly.

4. In the method of shaping thermoplastic bodies, as defined in claim 1, wherein the bending force is applied as a substantially pure bending moment in a plane substantially bisecting the angle formed by said plates.

References Cited in the file of this patent

UNITED STATES PATENTS

| Number | Name | Date |
| --- | --- | --- |
| 784,101 | Brinkman | Mar. 7, 1905 |
| 1,847,310 | Schmitz | Mar. 1, 1932 |
| 1,965,736 | Dillman | July 10, 1934 |
| 2,011,121 | Sherman et al. | Aug. 13, 1935 |
| 2,025,922 | Weinrich | Dec. 31, 1935 |
| 2,227,476 | Williams et al. | Jan. 7, 1941 |
| 2,304,354 | Harvey | Dec. 8, 1942 |
| 2,433,055 | Linden et al. | Dec. 23, 1947 |
| 2,437,259 | Kautz | Mar. 9, 1948 |
| 2,480,774 | Rossheim et al. | Aug. 30, 1949 |